US 11,795,585 B2

(12) United States Patent
Werfel et al.

(10) Patent No.: US 11,795,585 B2
(45) Date of Patent: Oct. 24, 2023

(54) DEVICE AND METHOD FOR WINDING AND TWISTING FIBER MATERIAL IN RING SPINNING OR RING TWISTING FRAMES

(71) Applicant: Sanko Tekstil Isletmeleri San. Tic. A.S., Gaziantep (TR)

(72) Inventors: Frank Werfel, Leipzig (DE); Uta Flögel-Delor, Loßwig (DE)

(73) Assignee: Sanko Tekstil Isletmeleri San. Tic. A.S., Sehitkamil/Gaziantep (TR)

( * ) Notice: Subject to any disclaimer, the term of this patent is extended or adjusted under 35 U.S.C. 154(b) by 0 days.

(21) Appl. No.: 17/663,218

(22) Filed: May 13, 2022

(65) Prior Publication Data
US 2022/0364276 A1 Nov. 17, 2022

(30) Foreign Application Priority Data
May 15, 2021 (EP) .................................. 21000137

(51) Int. Cl.
*D01H 7/52* (2006.01)
*F16C 32/04* (2006.01)
*D01H 7/56* (2006.01)

(52) U.S. Cl.
CPC ............... *D01H 7/52* (2013.01); *D01H 7/56* (2013.01); *F16C 32/0438* (2013.01); *F16C 2340/18* (2013.01)

(58) Field of Classification Search
CPC . D01H 7/56; D01H 7/58; D01H 7/602; F16C 32/0438; F16C 2340/18
See application file for complete search history.

(56) References Cited

U.S. PATENT DOCUMENTS 3,785,140 A * 1/1974 Muller ................... D01H 7/606
57/119
3,851,448 A * 12/1974 Sano ....................... D01H 7/565
57/75

(Continued)

FOREIGN PATENT DOCUMENTS

CN 113174666 A 7/2021
DE 4103369 A1 9/1991

(Continued)

OTHER PUBLICATIONS

Sparing, M., A. Berger, F. Wall, V. Lux, S. Hameister, D. Berger, M. Hossain et al. "Dynamics of rotating superconducting magnetic bearings in ring spinning." IEEE Transactions on Applied Superconductivity 26, No. 3 (2016): 1-4.

(Continued)

*Primary Examiner* — Shaun R Hurley
(74) *Attorney, Agent, or Firm* — Smartpat PLC

(57) ABSTRACT

A device and a method for winding and twisting fibrous material in ring spinning and ring twisting frames are disclosed. The device and method allow the operating speed of the frames to be substantially increased, achieve higher productivity during ring spinning, and reduce the outlay, in terms of time and material, for assembling and servicing the device. This is achieved in that at least two high-temperature superconducting stators, together with the thermally connected cooling devices thereof, are arranged in a contactless manner and in parallel with one another along the progression of the spindle row, and the magnetic field-generating rotors, oriented coaxially with respect to the spindle, are introduced in a magnetically levitating manner in the magnetic field of the continuous intermediate space, between the stators which are adjacent in each case.

14 Claims, 4 Drawing Sheets

(56) References Cited

U.S. PATENT DOCUMENTS

| | | | |
|---|---|---|---|
| 5,197,270 A | 3/1993 | Stahlecker | |
| 5,231,076 A * | 7/1993 | Jeong | C04B 35/653 423/594.16 |
| 5,330,967 A * | 7/1994 | Takahata | F16C 32/0438 310/90.5 |
| 5,631,617 A * | 5/1997 | Morishita | B60L 13/10 104/285 |
| 5,763,971 A * | 6/1998 | Takahata | F16C 32/0438 310/90.5 |
| 6,136,756 A * | 10/2000 | Langbein | H10N 60/857 29/599 |
| 6,175,175 B1 * | 1/2001 | Hull | F16C 32/0438 310/90.5 |
| 6,573,628 B1 * | 6/2003 | Sloupensky | F16C 32/044 57/406 |
| 10,767,285 B2 * | 9/2020 | De Haas | F16C 32/0438 |
| 2002/0047404 A1 * | 4/2002 | Coenen | D01H 4/12 310/68 B |
| 2002/0074882 A1 * | 6/2002 | Werfel | G01M 17/007 310/90.5 |
| 2010/0289200 A1 * | 11/2010 | Fukui | H02K 55/02 269/8 |
| 2015/0018217 A1 * | 1/2015 | Jawdat | F16C 32/0438 310/90.5 |
| 2019/0127892 A1 | 5/2019 | Haas et al. | |

FOREIGN PATENT DOCUMENTS

| | | |
|---|---|---|
| EP | 3231904 A1 | 10/2017 |
| EP | 3812492 A4 | 7/2021 |
| JP | H05272539 A | 10/1993 |
| WO | 2008028371 A1 | 3/2008 |
| WO | 2012100964 A2 | 8/2012 |
| WO | 2017178196 A1 | 10/2017 |
| WO | 2019037836 A1 | 2/2019 |

OTHER PUBLICATIONS

Werfel, F. N., U. Flögel-Delor, R. Rothfeld, D. Wippich, and T. Riedel. "Centrifuge advances using HTS magnetic bearings." Physica C: Superconductivity 354, No. 1-4 (2001): 13-17.

Espenhahn, Tilo, Florian Wunderwald, Marcel Möller, Maria Sparing, Mahmud Hossain, Günter Fuchs, Anwar Abdkader, Chokri Cherif, Kornelius Nielsch, and Ruben Hühne. "Influence of the magnet aspect ratio on the dynamic stiffness of a rotating superconducting magnetic bearing." Journal of Physics D: Applied Physics 53, No. 3 (2019): 035002.

Hossain, Mahmud, Anwar Abdkader, Chokri Cherif, Maria Sparing, Dietmar Berger, Günter Fuchs, and Ludwig Schultz. "Innovative twisting mechanism based on superconducting technology in a ring-spinning system." Textile research journal 84, No. 8 (2014): 871-880.

Hossain, Mahmud, Christian Telke, Anwar Abdkader, Chokri Cherif, and Michael Beitelschmidt. "Mathematical modeling of the dynamic yarn path depending on spindle speed in a ring spinning process." Textile Research Journal 36, No. 11 (2016): 1180-1190.

Rahman, Mustafijur, and Md Golam Nur. "Recent Innovations in Yarn Technology: A Review." International Journal of Scientific and Research Publications 4, No. 6 (2014): 7.

Smythe, W. R. "On eddy currents in a rotating disk." Electrical Engineering 61, No. 9 (1942): 681-684.

Xia, Zhigang, and Weilin Xu. "A review of ring staple yarn spinning method development and its trend prediction." Journal of Natural Fibers 10, No. 1 (2013): 62-81.

* cited by examiner

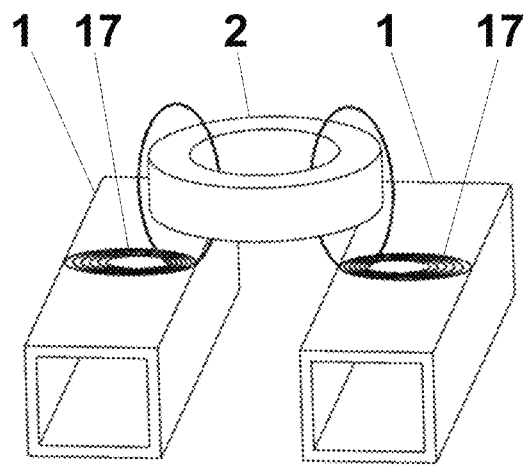
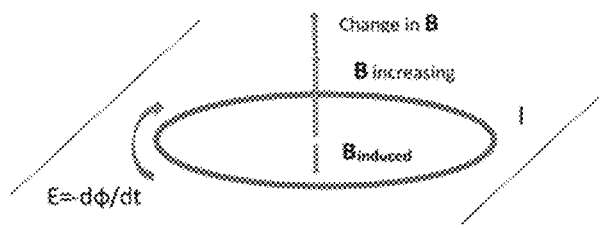
Fig. 7a                    Fig. 7b
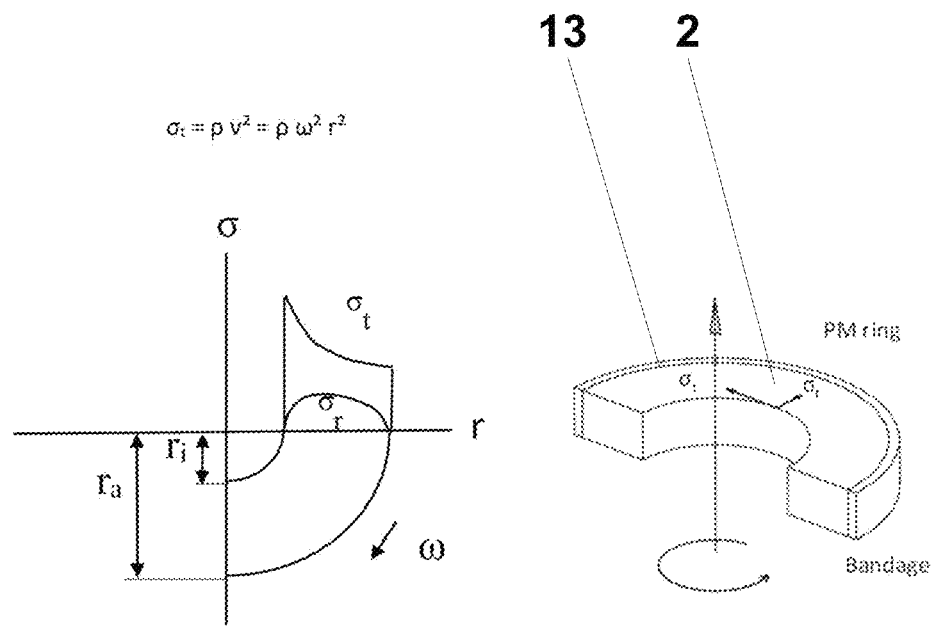
Fig. 8a                    Fig. 8b

DEVICE AND METHOD FOR WINDING AND TWISTING FIBER MATERIAL IN RING SPINNING OR RING TWISTING FRAMES

CROSS-REFERENCE TO RELATED APPLICATION

This application claims the benefit of European Patent Application No. 21000137.6, filed May 15, 2021, the contents of which is incorporated by reference in its entirety.

TECHNICAL FIELD

The disclosure relates to a device and to a method than can be applied by the device, which serve for winding and twisting in particular yarns in ring spinning and ring twisting frames.

BACKGROUND

Ring spinning technology is the oldest form of fiber spinning and is still used. However, on account of the high quality of the yarn and the flexibility, the ring spinning method is the dominant technique in yarn production. Globally, the use of the ring spinning method is associated with a series of advantages which can barely be replaced by other techniques. Essential advantages are:
- production of both fine-fiber and high-strength yarns;
- universal applicability to a large variety and to very specific yarns;
- ring spinning is flexible with respect to amounts, yarn quality, and uniformity.

Ring spinning can achieve the largest range of yarn thicknesses, at the highest strength and quality. In contrast thereto, ring spinning is slower than other modern spinning systems such as rotor, friction, nozzle or eddy spinning, and requires more processing steps. The manufacturing limits and productivity is determined by the ring rotor system which, in the case of higher speeds, causes mechanical friction in connection with heating of the rotor or of the strand guide. Consequently, the yarn is burnt, burns through, and tears.

Shortly after the discovery of the high-temperature superconductor (HTS) in 1986/87, the combination of a permanent magnet (PM) with the new superconductors was proposed, which demonstrates virtually frictionless levitation and rotation. Later, the SMB technique for use in centrifuges was already described in the literature in 2001. It was possible to demonstrate that the new magnetic bearing type allows for extremely high rotations per minute (rpm) of above 105. The advantages and the uses of the HTS magnetic bearings are useful for many applications, in particular in high-tech solutions.

The virtually frictionless operation allows for high speeds without lubrication, no wear, and no particle formation, even under difficult ambient conditions such as heat, cold, steam, vacuum and aggressive chemicals.

At the same time it was learnt to understand the rotor dynamics with self-regulating imbalance compensation, overcoming of critical speeds in high-speed operation, and increasing rotor speeds, as well as simultaneously shifting superconducting magnetic bearings (SMB) into the load range of tonnes, such as in the case of use in flywheel energy stores.

The first experiments and uses of SMB in ring spinning technology began in 2010. Later, the Dresden group of Hussain, de Haas and Schultz studied, in detail, the significant advantages of replacing the conventional ring spinning methods with the use of a rotating SMB. In this case, the SMB design followed the coaxial PM-ring-to-HTS-ring design, which was integrated in a stainless steel vacuum cryostat. The experiments are described in detail and analysed in the literature. The significant outlay for the superconductor ring geometry is a disadvantage.

Spooling and ring twisting devices of a ring spinning or ring twisting frame are known from WO 2012/100964 A1 and WO 2017/178196 A1. In these devices, the friction between the ring and rotor is eliminated by magnetic levitation, as a result of which the acting friction forces are reduced. An annular stator consisting of a superconducting material having a corresponding stator cooling device is used. Apart from the annular stator, an annular permanent magnetic rotor is used which is arranged so as to be rotatable relative to the stator and so as to be coaxial about the spindle, with a lug-like strand guide element. In this case, an annular axial gap is formed between the stator and the rotor. When the superconducting material of the stator is cooled to below the transition temperature, the magnetic flux of the rotor is coupled into the cooled stator and magnetically trapped. As a result of this coupling, the rotor is inherently stable above or inside the stator. The strand is guided around the rotor from the outside, through the axial gap between the stator and rotor, and wound onto the coil. The stator and the rotor have particularly rounded shapes in order that the strand does not encounter any edges which prevent the circulation of the strand in the gap. Prior to the magnetization and cooling of the HTS stator, a mechanical support serves for the optimal operating position. The contactless bearing of the rotating rotor eliminates the conventional, frictional heat-generating ring/rotor system as a productivity-limiting component. Advantageously, the entire rotor together with the strand guide element is then set into rapid rotation, which is substantially frictionless apart from slight magnetic friction, and thus allows for significantly higher spindle rotational speeds.

However, the rotor designed as a magnetic ring has a significant dead weight, which also has to be accelerated when the spindle is started up. Furthermore, the freely levitating magnetic ring cannot be encapsulated, and therefore the rotor, running at high rotational speeds of from approximately 20,000 to 30,000 rotations per minute (rpm) constitutes a safety risk for operators of the facility. Finally, the strand guide element on the magnetic ring rotor constitutes an imbalance, which becomes ever more problematic, on account of vibrations, as the speed of the spindle increases.

SUMMARY

The disclosure provides a device and a method for winding and twisting fibrous material in ring spinning and ring twisting frames, by means of which the operating speed of the frames can be substantially increased, higher productivity during ring spinning can be achieved, and the outlay, in terms of time and material, for assembling and servicing the device can be reduced.

The solution proposes a superconducting magnetic bearing (SMB) which comprises a permanent magnetic (PM) ring as the rotor, which levitates in a contactless but stable manner, over a superconductor as a cooled stator. In this case, the relevant rotor is arranged coaxially with respect to the associated spindle, and the strand to be spooled is caused to rotate in the gap between the rotor and stator. An efficient and variably adjustable design of the device is achieved in that at least two high-temperature superconducting stators, together with the thermally connected cooling devices thereof, are arranged in a contactless manner and in parallel with one another along the progression of the spindle row, and the magnetic field-generating rotors, oriented coaxially with respect to the spindle, are introduced in a magnetically levitating manner in the magnetic field of the continuous intermediate space, between the stators which are adjacent in each case. An additional increase in the stabilisation of the position in the magnetic bearing is achieved if the magnetic field-generating rotors are provided with ferromagnetic magnetic flux collectors which serve to increase the field strength and to guide the magnetic field towards the high-temperature superconductor. A cost reduction for the material outlay is advantageously achieved if the high-temperature superconducting stators each consist of at least two bulk HTS elements which are designed so as to be separated from one another, in portions, along the longitudinal extension of the stators, and which are associated with respective magnetic field-generating rotors.

It is advantageous, for simple and time-saving assembly, for the high-temperature superconducting stators to consist of material that is joined together in a layered manner, and are designed so as to be strip-like or cable-like in the longitudinal extension thereof. A simple and material-saving design of the device is effectively achieved in that the high-temperature superconducting stators are formed of a thermally insulated tube-in-tube configuration, in which the inner "cold" tube, connected to the HTS stator, is of a temperature which is below the superconducting critical temperature, and the outer tube assumes the surrounding ambient temperature. A favourable embodiment of the device for use at high working speeds is achieved if the outer tube is made of a material which has a high electrical conductivity suitable for generating eddy currents, and thereby brings about additional magnetic stabilization during the rotational spinning and twisting operation. Stable magnetic bearing of the rotors, at a simultaneously low cost, is advantageously achieved in that the stators are in each case formed of a YBaCuO crystal of the composition $Y_1Ba_2Cu_3O_x$ (Y123) or a single crystal of the REBaCuO group of the composition $RE_1Ba_2Cu_3O_x$ (RE—rare earth) and the superconductors of the bismuth family BiSrCaCuO.

Technical and economic improvements of the machines are achieved by the use of new linear and superconducting HTS bulk stator arrangements. The device allows virtually frictionless high-speed operation of the rotors. This is achieved by the highly simplified stator suspension and the possible simultaneous cooling of all stators involved.

The solution provided smooths the path for a modular design and collective cooling by means of liquid nitrogen LN2. Furthermore, the HTS material and machine costs are significantly reduced.

The following detailed description is merely exemplary in nature and is not intended to limit the invention or the application and uses of the invention. Furthermore, there is no intention to be bound by any theory presented in the preceding background or the following detailed description.

BRIEF DESCRIPTION OF THE DRAWINGS

FIG. 7a schematically shows the additional stabilization of the rotor and FIG. 7b illustrates its operating principle.

FIG. 8a illustrates a centrifugal force curve and FIG. 8b shows the enveloping bandage of the rotor, for the purpose of compensating the dynamic forces.

DETAILED DESCRIPTION

Figure 1:
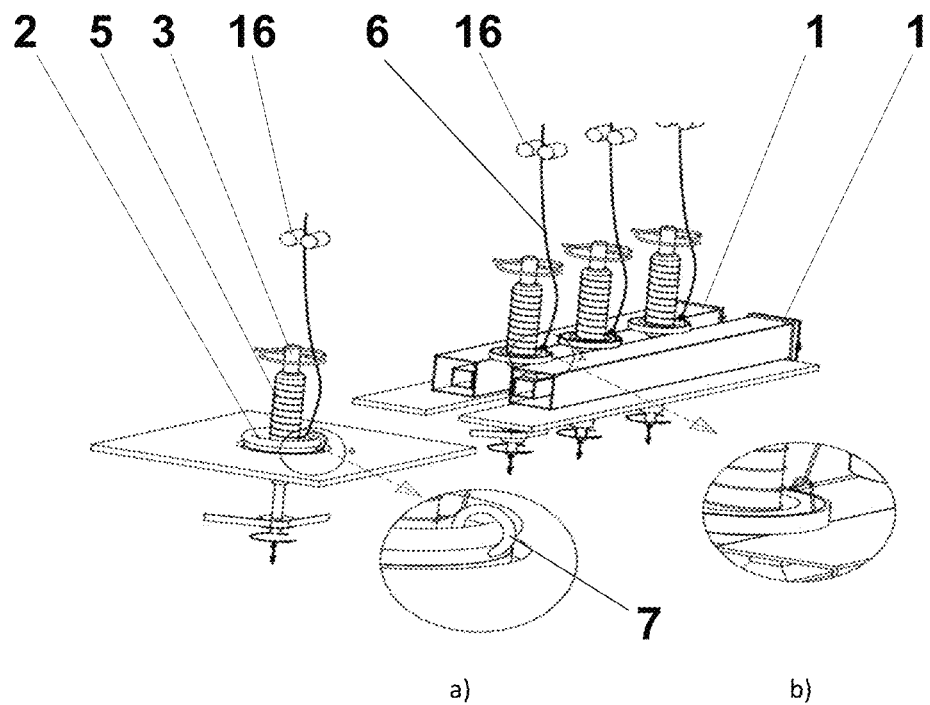
FIG. 1 is a schematic comparative view of the prior and new magnetic bearing and rotors.

FIG. 1 schematically shows a comparison between the conventional ring single yarn twisting (a) and the HTS high-speed ring spinning method by means of a winding ring and traveler construction suspended magnetically and in a frictionless manner (b). For this purpose, the spindles 3, together with the yarn spooled to form coils 5, are magnetically mounted between two high-temperature superconducting stators 1 that are arranged in parallel. In both arrangements, annular magnetically mounted magnetic field-generating rotors 2 are used. The yarn to be spooled is fed by the feeder system 16 of the machine. The difference between the two solutions consists in the design of the magnetic bearing, and the cooling system, required in each case, of the high-temperature superconductor. Typically, the HTS magnetic bearing is arranged so as to be coaxial to each spindle 3, and the cooling system is adapted in a complex manner to every individual bearing. In contrast, in the case of the magnetic bearing according to the disclosure, the magnetic bearing is achieved between two adjacent HTS stators extending along the spindle row. In this case, the required cooling system is designed so as to allow for simultaneous cooling of all the stators, in a simple manner.

Figure 2:
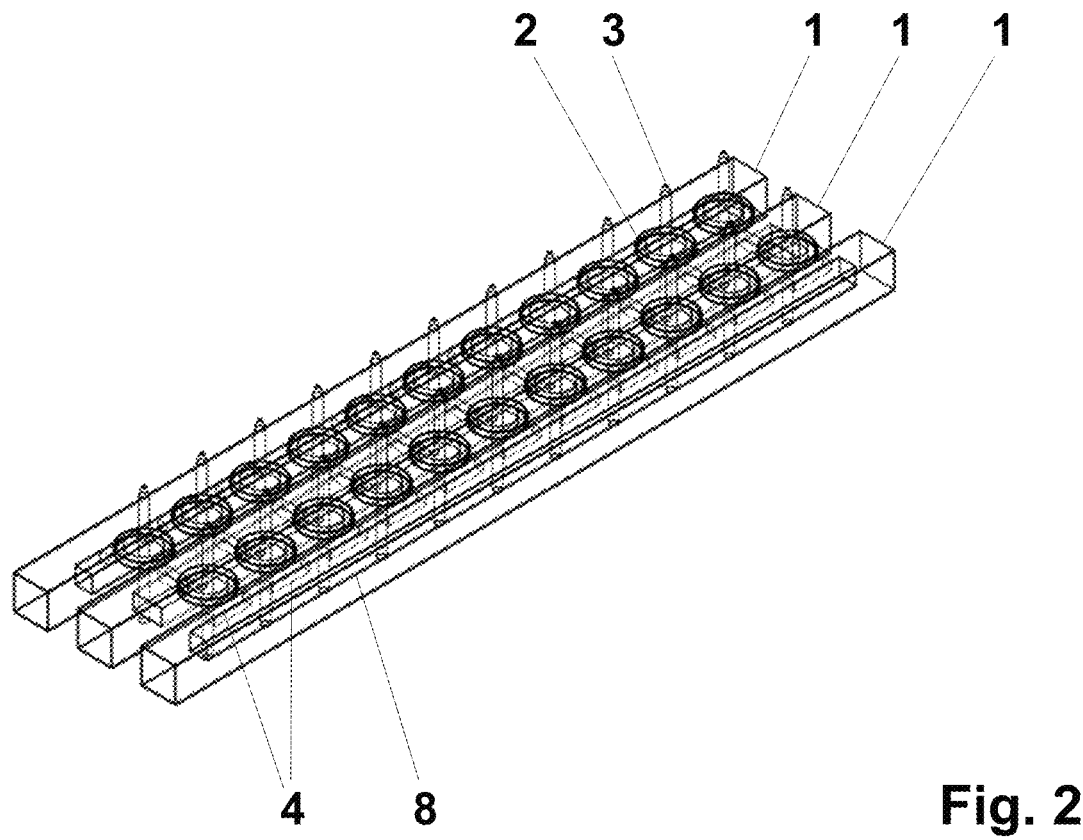
FIG. 2 is a perspective view of the magnetic bearing comprising three stators-

The perspective view shown in FIG. 2 shows the superconducting magnetic bearing comprising three stators 1. The rotors 2 are designed as permanent magnetic rings having integrated travelers (e.g. lugs). The stators 1 provided with high-temperature superconductors (HTS) extend in parallel with one another and along the spindle row. The rotors 2 are magnetically mounted in the intermediate space between two adjacent stators 1 in each case. It is furthermore possible, if required, to also arranged further stators 1 in parallel. A small tube 8, comprising HTS superconductors arranged thereon, is introduced in the interior of the stators 1 formed as tubes 9. Said superconducting materials 4 are applied, in portions, along the longitudinal extension of the tube 8 such that they achieve the intended position of the relevant rotor 2. The solution provided is adapted, in terms of structure and design, to the conventional ring spinning machines. On account of the linear structure, the innovation follows the traditional ring spinning frame design and eliminates the necessity for significant ring spinning frame changes if conventional ring traveler devices are replaced by superconducting magnetic bearings (SMB). In this case, the system operates in a contactless manner and exhibits extremely low rotational friction.

The free suspension of the rotor combination above the HTS stator 1, and the rotation thereof at virtually the speed of the spindle, makes it possible for the frictional heat of the rotor 2 to be significantly eliminated, even when the rotor speed is further increased. In this case, in the dynamic process only a low friction force between the strand and traveler is generated. The generated rotation of the rotor 2 significantly reduces the strand/traveler frictional interaction, as a result of which the majority of the heat source is eliminated. In this case, the rotor 2 and the stator 1 are designed such that in each case a circular air gap is formed, so as to be axially spaced between the rotor 2 and the stator 1 and coaxial to the spindle 3. The strand is guided through the rotating traveler, and can be wound onto the rotating coil body. In contrast to previous bearing solutions, in which adjacent spindles 3 run at ambient temperature conditions in the feed-through of a cryostat, in the new solution the spindles 3 do not have to be kept separate, and have clear space along the spindle row. This construction allows for combined LN2 cooling of a row of corresponding stators 1 having a large free space. Furthermore, in this way spindles 3 and coils can be serviced or replaced much more easily.

Figure 3:
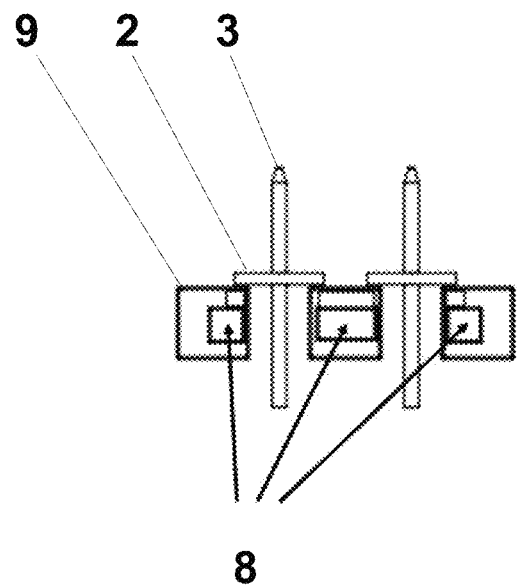
FIG. 3 is a cross-sectional view of the magnetic bearing comprising three stators.

FIG. 3 shows the schematic cross-sectional structure of the magnetic bearing that is formed of three stators 1. The arrangement of the inner tubes 8 in the respective outer tubes 9 is visible. The rotors 2, together with the associated spindles 3 in each case, are magnetically suspended in the intermediate space between two adjacent stators 1 in each case. Between the tubes (8; 9), the simultaneous cooling of all the superconductors is performed by cooling by means of liquid nitrogen (LN2).

Figure 4:
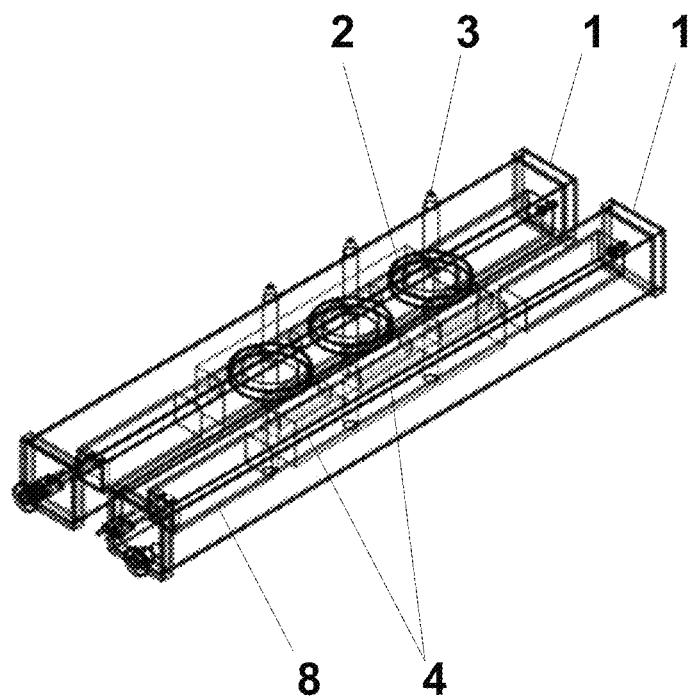
FIG. 4 is a perspective view of the magnetic bearing comprising two stators.

The illustration of FIG. 4 shows the perspective view of a magnetic bearing consisting of two stators 1. In this embodiment, too, the HTS superconductors 4 are applied to the inner tube 8, in portions along the longitudinal progression of the stators 1, and are positioned, in terms of location, such that they magnetically achieve the position of the spindles 3 that is to be assumed. Furthermore, the possibility is also provided of designing the HTS superconductors 4 so as to be strip-like or cable-like, which superconductor is applied to the inner tube 8, over the entire length of the stator 1, during assembly. At the magnetic bearing points of the rotor 2, provided in each case, the HTS superconductor, which is generally constructed in a layered manner, is already adapted to the magnetic strengths to be generated, during the prefabrication.

Figure 5:
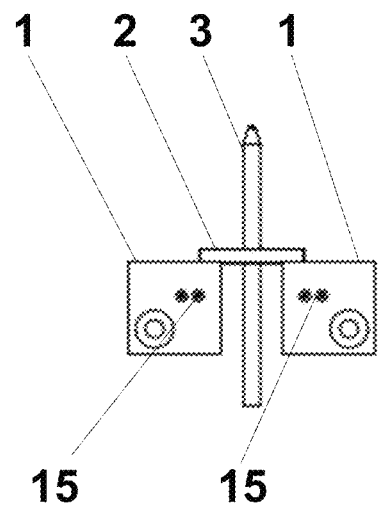
FIG. 5 is a cross-sectional view of the magnetic bearing comprising two stators.

A cross-sectional view of the magnetic bearing formed of two stators 1 is visible in FIG. 5. In addition to the bearing of the rotors 2 already set out, the cooling lines 15 leading into and out of the interior of stators 1 can be seen in the schematic drawing.

Figure 6:
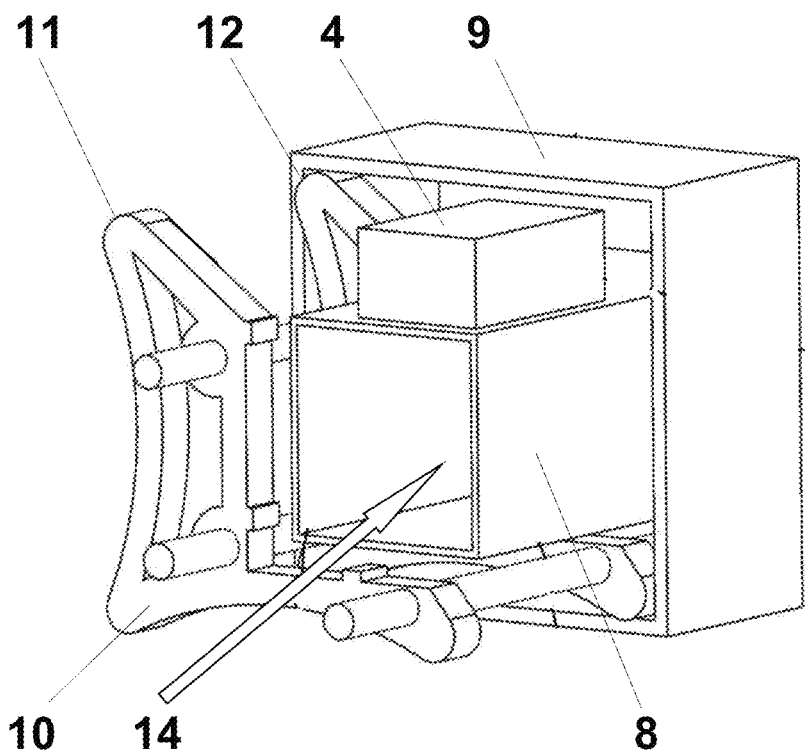
FIG. 6 shows the structural internal design of the stator.

The structural internal design of the stator 1 is visible from the illustration of FIG. 6. In this case, the square outer tube 9 constitutes the vacuum chamber for the likewise square inner tube 8. The HTS superconductor 4 is adhesively bonded to the inner cold tube 8. Liquid nitrogen, as a coolant, is introduced into the inner tube 8. The magnetic fixing of the inner tube 8, connected to the HTS superconductor 4, is achieved by means of spacer assemblies 10 consisting of glass fiber structures. These are designed such that they have a heat-conducting connection to the outer tube 9 only at the punctual rests 11, 12. As a result, a heat-conducting connection between the "cold" inner tube 8 and the outer tube 9, adjusted to the ambient temperature, is largely prevented. Since the bars can consist of a lightweight AL alloy, the design can be constructed in a very compact manner, and at a low weight. Furthermore, the AL alloy material of the cryostat achieves a high thermal connection between the inner tube 8 and the HTS superconductor 4. However, the high thermal expansion coefficient of the AL alloy at ambient temperature must be taken into account in the determination and fixing of the exact longitudinal position of the superconducting stators 1 in the 4-5 m long carrier elements.

The schematic view of an additional stabilization of the position of the rotor 2 is visible in FIG. 7. In addition to the levitation of the strand-guiding annular rotor 2, in an innovative manner additional stabilization is achieved by electrical eddy currents 17 which are induced in the cryostat and the stators 1. The inner and outer tube consist of an electrically conductive aluminium alloy. As a result, the rotating rotor 2 will levitate over a metal Al sheet. Two effects can thereby contribute to the stabilization of the rotating rotor 2. According to Lenz's law, the direction of every magnetic induction effect is such that it acts counter to the cause of the effect. As a result, the direction of the magnetic force on the moving magnet is counter to its movement. The induced current results in the current status quo being preserved, in that it counteracts the movement or a flux change. A lift, in the normal direction with respect to the conducting plane, and a resistance braking force counter to the direction of rotation, exist above the stators 1. Accordingly, both forces contribute to additional retention and stabilization of the rotating rotor 2 during winding and twisting. A further embodiment is the generated braking force, which, as a result of the change in the peripheral magnetisation of the annular rotor 2, brings about rapid braking of the rotating rotor 2. At a low speed, the resistance is proportional to the speed $v=\omega/r$ and greater than the lift, which is proportional to $v^2$.

As the speed of the rotor 2 increases, the resistance achieves a maximum and reduces by $1/(v)^{1/2}$. In contrast, the lift, which stabilises the rotor 2, increases, at a low speed, by $v^2$, and overtakes the resistance as the speed increases. The ratio of lift to resistance is of significant practical importance, and results in $f_L/f_D = v/v_i$, wherein $v$ and $v_i$ are the speeds of the magnetic dipole above the conductive sheet and the corresponding positive and negative image which propagates downwards at the speed $v_i$.

The graph of FIG. 8 shows the fundamental behavior of the rotors 2 in the case of high-speed ring spinning applications. In the case of the solution according to the disclosure for high speeds, the rotational friction and the dynamic effects of the magnetic bearing are particularly important. The essential advantages of superconducting bearings compared with conventional bearings are significant in this field. The superconducting passive magnetic bearings exhibit substantially lower friction than conventional rolling bearings, at least by a factor of forty. Even in comparison with pressurised air bearings, the friction of the passive magnetic HTS bearing is in the permille range, and is therefore surprisingly small. This extremely low friction is the physical basis for the innovative ring spinning technology, up to very high spindle rotational speeds.

The centrifugal forces are a further critical point of the ring rotor dynamics. The present disclosure focusses on rotational speeds of the permanent magnetic rotor 2 comprising the strand guide of up to 50,000 rpm. A rotor 2 of size 60 cm×40 cm×1 cm, which serves as a twisting and rotation element, is subject to extremely high centrifugal forces, which can destroy the operating ring. In a first approach, it is intended to consider the maximum tensile force or force density by way of the tangent vector at the inside radius $r_i$.

$$\sigma_t = \rho v^2 = \rho \omega r^2$$

When the annular rotor 2 rotates, different centrifugal forces result, which can destroy the rotor 2. The highest mechanical forces arise at the inside radius of a rotating ring. The value of the tensile stress of sintered NdFeB is approximately 80-90 MPa (12,000 psi). However, at a rotational speed of 50,000 rpm about the spindles, a PM ring made of NdFeB, of a size 60×40×10 is subjected to a maximum tangential force density of ~185 MPa; more than a factor of two than the intrinsic material tensile stress. Accordingly, the dynamic forces have to be compensated by a corresponding enveloping bandage 13 in the peripheral direction of the rotor 2.

The bandage ring 13 should consist of materials having a high tensile stress, either metal, such as non-magnetic stainless steel, high-strength Al or Mg alloys, or a non-metal ring consisting of glass or carbon fiber compounds. In the best and optimum case, the safety ring reinforcement ensures pre-pressure on the rotor 2 even at a speed of zero, and then prevents any cracks or defects of the NdFeB magnetic ring below the nominal operating speeds. As a practical solution, a safety ring thickness of 3 mm Al alloy AL7075 was selected, and rigidly connected to the rotor 2 by means of thermal shrinkage.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

LIST OF REFERENCE CHARACTERS 1 stator
2 rotor
3 spindle
4 HTS superconductor
5 coil
6 yarn
7 traveler
8 inner tube
9 outer tube
10 spacer assembly
11 punctual rest
12 punctual rest
13 bandage
14 working gas N2
15 cooling lines
16 feeder system
17 electrical eddy current

What is claimed is:

1. A device for winding and twisting fiber material in ring spinning or ring twisting frames, comprising:
at least two high-temperature superconducting stators (1), each stator (1) comprising at least one high-temperature superconducting material (4) and a stator cooling device; and
annular, magnetic field-generating rotors (2), each of the rotors (2) being coaxially associated with a rotatable spindle which, together with a traveler, serves for guiding and spooling a strand onto the spindle,
wherein the at least two stators are arranged in a contactless manner and in parallel with one another along a progression of a spindle row, and
wherein the magnetic field-generating rotors (2) are introduced in a magnetically levitating manner in a magnetic field of a continuous intermediate space between the stators (1).

2. The device according to claim 1,
wherein the magnetic field-generating rotors (2) are provided with ferromagnetic magnetic flux collectors which serve to increase a field strength and to guide the magnetic field towards the superconducting material (4).

3. The device according to claim 1,
wherein the at least two high-temperature superconducting (HTS) stators (1) each comprise at least two bulk HTS elements which are designed so as to be separated from one another, in portions, and which are associated with respective magnetic field-generating rotors (2).

4. The device according to claim 1,
wherein each of the at least two stators (1) consist of material that is joined together in a layered manner, and designed so as to be strip-like or cable-like in a longitudinal extension thereof.

5. The device according to claim 1,
wherein the at least two high-temperature superconducting stators are formed of a thermally insulated tube-in-tube configuration, in which during use
an inner "cold" tube (8), connected to the stator (1), is cooled to a temperature below a superconducting critical temperature, and
an outer tube (9) assumes a surrounding ambient temperature.

6. The device according to claim 5,
wherein the outer tube (9) is made of a material which has a high electrical conductivity suitable for generating eddy currents, and thereby brings about additional magnetic stabilization during the rotational spinning and twisting operation.

7. The device according to claim 5,
wherein the inner tube (8) is cooled by supplying liquid nitrogen, and
wherein thermal heat conduction between the inner tube (8) and the outer tube (9) is prevented by thermal vacuum insulation between the inner tube (8) and the outer tube (9) and by punctual rests (11; 12) of mechanical spacer assemblies (10) inserted between the inner tube (8) and the outer tube (9).

8. The device according to claim 5,
wherein the inner tube (8) is cooled by a connection to a cryocooler.

9. The device according to claim 1,
wherein each of the at least two stators (1) is formed of a YBaCuO crystal of the composition $Y_1Ba_2Cu_3O_x$ (Y123) or a single crystal of the REBaCuO group of the composition $RE_1Ba_2Cu_3O_x$ (RE—rare earth) and the superconducting material is of the bismuth family BiSrCaCuO.

10. The device according to claim 1,
wherein each of the at least two stators (1) consists of a plurality of single crystals that are arranged side-by-side or are grown together.

11. The device according to claim 1,
wherein, for the purpose of compensating their centrifugal forces, the magnetic field-generating rotors (2) each comprise an encompassing bandage (13) which consists of a material having a high tensile strength.

12. The device according to claim 1,
wherein in the stator cooling device, for the purpose of additional stabilization, an electrodynamically assisted levitation is affected by a material with a high electrical conductivity and due to an eddy current generation in a metallic surface of the stator cooling device.

13. A method for winding and twisting fiber material in ring spinning or ring twisting frames, in which permanent magnetic rings, which serve as the rotors, are mounted in high-temperature superconducting magnetic bearings, comprising:
providing the device according to claim 1;

mounting the rotors (2) which are associated in a coaxial manner with the spindles (3) in a magnetically levitating manner within a continuous intermediate space between the at least two stators (1);

connecting the least two stators (1) to cryostats;

wherein simultaneous cooling of the at least two stators (1) is carried out by the cryostats which are connected to the at least two stators (1) and which also extend along the spindle row.

14. The method according to claim 13, wherein the cooling of the at least two stators (1) is achieved by suppling liquid nitrogen via an inner tube (8), extending along the spindle row, of a tube-in-tube connection of the cryostat, a thermal insulation between the inner tube (8) and an outer tube (9) being achieved by vacuum insulation, the method further comprising:

condensing, liquifiying, and supplying back to the cooling lines returned "cold" working gas N2 (14) by continuous mechanical re-cooling.

\* \* \* \* \*